United States Patent Office 3,698,869
Patented Oct. 17, 1972

3,698,869
ANALYSIS OF GASEOUS MIXTURES
Richard D. Condon, Ridgefield, Conn., assignor to The Perkin-Elmer Corporation, Norwalk, Conn.
Filed Aug. 20, 1965, Ser. No. 481,341
Int. Cl. G01n 27/18, 31/06, 31/12
U.S. Cl. 23—232 R        10 Claims

ABSTRACT OF THE DISCLOSURE

A self-integrating CHN analyzer operating at super-atmospheric pressure with improved water measurement capabilities. The organic sample is burned in oxygen and the products of combustion are forced into a reservoir by a carrier gas. A portion of the reservoir contents are then permitted to escape to atmosphere through an elongated delay volume where a portion is retained and water equilibrium is established. Thereafter, carrier gas displaces the retained portion at a constant pressure head through measuring cells responsive to water, carbon dioxide, and nitrogen.

---

This invention relates to method and apparatus for quantitatively analyzing gaseous mixtures and, more particularly, to analyzing the combustion products of organic samples.

One procedure for performing an elemental analysis of a small sample of an organic compound is to burn the sample in the presence of oxygen and quantitatively analyze the combustion products to determine the amounts of carbon dioxide, water, and nitrogen which are formed. The amounts which are produced are indicative, respectively, of the amounts of carbon, hydrogen, and nitrogen in the sample under test. The most common prior art method for making such an analysis has been to pass the components into a thermal conductivity cell by means of a carrier gas. The flow rate was maintained at a constant level and the signal level of the measuring device varied as a function of time. It was then necessary to integrate the area under each peak to determine the amount of the combustion product being measured.

An improvement over the above prior art technique is disclosed in an article by J. T. Clerc and W. Simon entitled "Limitations of a Self-Integrating Method for the Simultaneous C, H, and N Determination by Thermal Conductivity Measurement" which appears in 7 Microchemical Journal 422 (1963). In the method disclosed therein, a self-integrating technique is employed which utilizes an evacuated system. Basically, the system includes a reservoir and a balancing chamber which are interconnected by means of series-connected separation devices for removing water, carbon dioxide, and nitrogen in turn. A detector associated with each separation device measures the difference in thermal conductivity between the gas entering and the gas leaving the device as an indication of the amount of the combustion product trapped therein. The reservoir, balancing chamber, and separation devices are all contained within a temperature controlled chamber. In making an analysis, the system is first evacuated. The combustion products are then admitted into the evacuated reservoir until the pressure in the reservoir reaches a certain predetermined level. A valve at the outlet of the reservoir is then opened so that the contained gas passes through the separation devices and detectors into the evacuated pressure balancing vessel. When a steady state is reached, the output signal of each detector is read as an indication of the amount of the associated combustion product. This is an integrated readout due to the fact that a fixed volume of gas of controlled pressure and temperature is utilized for each analysis.

The Clerc-Simon device is a highly important advance in microchemical determination and greatly simplifies analyses that were formerly difficult and time-consuming. However, the system has certain disadvantages which it would be desirable to overcome. Some of these disadvantages arise from the fact that the Clerc-Simon device is evacuated. An evacuated system, by its very nature, has many mechanical complexities. These are the result of leakage problems which require complex piping and valve arrangements. Also, it has proved to be difficult to stabilize the thermistor detectors after exposure to vacuum. This is probably due to the presence of small cracks in the glass coating of the thermistor beads. The elements have a large equilibrium time constant due to the slow diffusion of the gas within the cracks. Another problem, which is related to the evacuated system, arises from the fact that one of the components being measured is water. Water is a substance that is almost always present on the surfaces of physical objects unless specialized and expensive drying techniques are employed. A vacuum system tends to strip this water from the internal surfaces of the apparatus so that a false water measurement is obtained. Another problem is also related to the water measurement. As the gases flow from the reservoir into the evacuated pressure balancing vessel, the gas pressure drops and the concentration of water increases. This is apparently due to a shift in the equilibrium between the water vapor and the adsorbed water on the walls of the apparatus. This, of course, creates difficulty in making accurate and reproducible water measurements.

Accordingly, it is a primary object of the present invention to provide an improved self-integrating system for the determination of carbon, hydrogen, and nitrogen in the combustion products of organic materials. Other objects are to provide such a system which operates at above atmospheric pressure; which provides a more accurate determination of water content; which utilizes simpler apparatus; and which is less expensive. The manner in which the foregoing objects are achieved will be more apparent from the following description, the appended claims, and the figures of the attached drawing, wherein:

In accordance with this invention, a measured volume of a gaseous mixture is trapped at a known temperature and preselected superatmospheric pressure. A portion of the trapped volume is passed to atmosphere successively through a sample and a reference chamber. At least one component is removed from the mixture intermediate the sample and reference chambers. The physical characteristics of the mixtures in the sample and reference chambers are then compared to indicate the amount of the component in the mixture.

Figure 1:
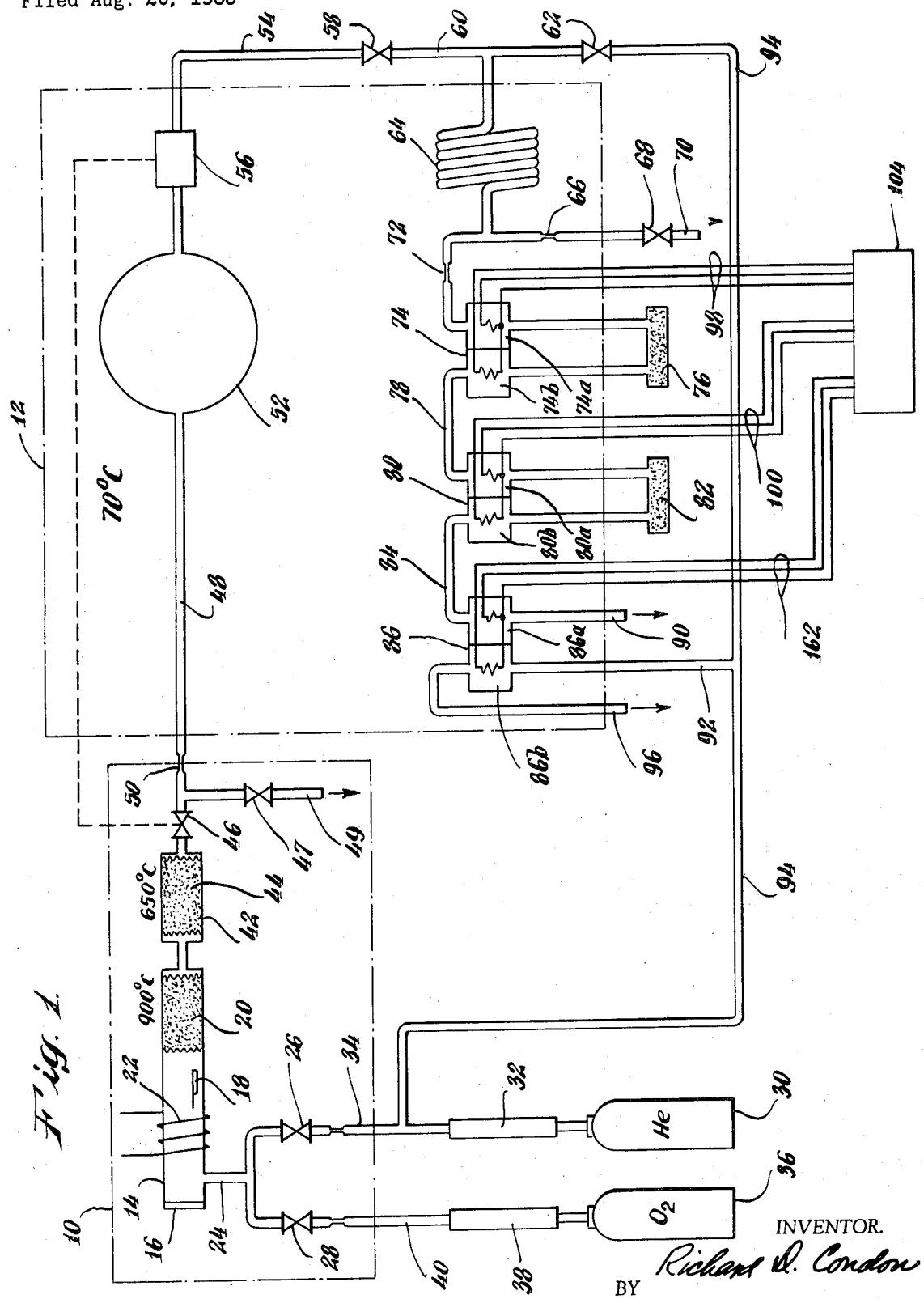
FIG. 1 is a schematic diagram of an analyzer in accordance with this invention.

In FIG. 1 there is illustrated an apparatus including a combustion train 10 and a controlled temperature oven 12. The combustion train 10 includes a combustion tube 14 having an inlet end with a removable end cap 16. The temperature of the combustion tube is controlled from an external heating source (not shown). The inlet end of the combustion tube 14 is arranged to receive a sample boat 18 and the outlet end is filled with an oxidizing agent 20 such as copper oxide or cobaltous oxide. Surrounding the combustion tube 14 is an electrically energized flashing coil 22. A gas inlet tube 24 is connected by means of a T-connection to both a carrier gas inlet valve 26 and an oxygen inlet valve 28. In the disclosed embodiment, the carrier gas is helium and is supplied from a tank 30 through a scrubber 32 and line 34. The oxygen is supplied from oxygen tank 36 through a similar scrubber 38 and line 40. The outlet end of combustion tube 14 is connected to the inlet of a reduction tube 42 which is also heated and contains a suitable reducing material such as copper 44. The outlet end of the reduction tube 42 communicates by way of a controlled valve 46 and a line 48, which includes a flow restrictor 50, with the inlet of a reservoir 52. At the outlet of valve 46 there is also provided a vent valve 47 and vent 49.

A line 54 connects reservoir 52 with a valve 58 through a pressure switch 56. Switch 56 controls the operation of valve 46, as indicated by the dashed line. A line 60, which includes a T, interconnects valve 58 with both a valve 62 and the inlet of an elongated delay volume 64 in the form of a coiled tube. The outlet of the delay volume 64 also goes to a T. One side of this T connects to a vent 70 through a flow restrictor 66 and a vent valve 68. The other side of the T connects to a water measuring cell 74 through a flow restrictor 72. The water measuring cell 74 is of the type which measures thermal conductivity by means of a thermistor or hot filament bridge. The cell includes a sample chamber 74a and a reference chamber 74b. Sample chamber 74a and reference chamber 74b are interconnected by means of a water trap 76 which may contain, for example, $Mg(ClO_4)_2$. A different arm of the measuring bridge is enclosed in each chamber to be contacted by the gas passing therethrough. This is in accordance with well known prior art measurement techniques.

A line 78 connects the reference chamber 74b with the sample chamber 80a of a carbon dioxide measuring cell 80, which also includes a reference chamber 80b. The sample and reference chambers of carbon dioxide measuring cell 80 are connected to a carbon dioxide trap 82 which may contain, for example, soda asbestos or lithium hydroxide.

A line 84 connects the reference chamber 80b to the sample chamber 86a of a nitrogen measuring cell 86, which also includes a similar reference chamber 86b. It will be noted that sample chamber 86a exhausts directly through a vent 90. The reference chamber 86b is supplied directly with carrier gas by a line 92 which is connected to a header 94. Header 94 is connected between line 34 and valve 62. The carrier gas which passes through sample chamber 86b is exhausted through a vent 96. The measuring cells 74, 80 and 86 are well known in the art so they will not be further described. The electrical output of each cell is supplied by means of conductors 98, 100, 102 to a common recorder 104.

Figure 2:
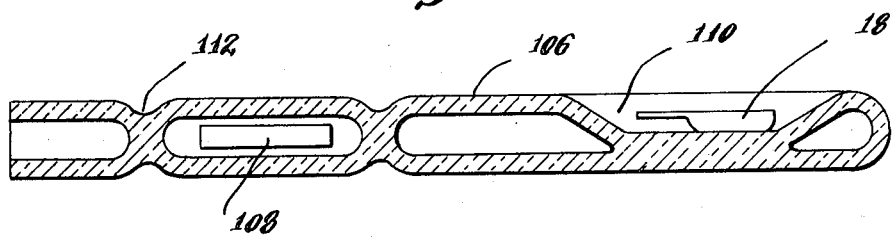
FIG. 2 is a cross section through a sample holder usable in this invention.

In the simplified illustration of FIG. 1, the sample boat 18 is illustrated as resting directly within the combustion tube 14. In practice, this would not be a suitable arrangement as some means must be provided for moving the boat beyond the high temperature zone established by flashing coil 22 without reopening the end cap 16. This is done in the conventional manner by means of the quartz tube 106 illustrated in FIG. 2. The tube encloses a short iron bar 108 and is formed to provide a depression 110 for receiving the boat 18 at one end and at its other end is provided with a notch 112, which can be easily grasped by tongs. The quartz tube and the boat 18 can be moved longitudinally within combustion tube 14 by means of an external magnet acting upon iron bar 108.

Operation

The operation of the device of FIG. 1 may be best understood by describing the analysis of an organic sample. Prior to the introduction of the sample, the device is placed in a standby position in which all elements are thoroughly flushed with helium gas. Referring to FIG. 1, the standby position involves having valves 26, 46 and 58 open. The other valves remain closed. There is thus a steady flow of helium gas in the forward direction through the combustion tube 14, the reduction tube 42, the reservoir 52, the delay volume 64, and through the various measuring cells and out vent 90. Helium gas is also flushing the reference chamber 86b of measuring cell 86. The temperature of oven 12 is thermostatically controlled at 70° C.

The organic sample to be tested is then placed within the sample boat 18 which is positioned in the quartz tube 106. The end cap 16 is removed from the combustion tube 14, and the quartz tube containing the sample boat inserted. After replacing the end cap 16, the system is purged by opening valves 47, 62 and 68. This causes an increased gas flow through the combustion and reduction tubes and also through the delay volume 64 and the various measuring cells. At the same time, the reservoir 52 is back-flushed. This condition continues for approximately 30 seconds, when valve 68 closes, causing the delay volume to exhaust through the measuring cells. Thereafter, valve 26 closes and valve 28 opens for approximately 30 seconds, permitting oxygen to pass into the inlet end of combustion tube 14. The quartz tube is then slid inwardly of the combustion tube 14, causing the sample boat 18 to be positioned beyond the high temperature zone formed by flashing coil 22. Valve 28 closes. The temperatures of the combustion tube 14 and reduction tube 42 are 900° C. and 650° C., respectively. The sample immediately explodes and static combustion continues for approximately two minutes. At the time of the initial explosion, valve 46 is open, as is valve 47, to vent 49. This allows the pressure of the explosion to escape downstream and out vent 49. However, the distance between the combustion zone and the vent is sufficiently great that the products of combustion do not themselves escape. Valve 46 closes ten seconds after the sample is introduced into the combustion zone (i.e. after the explosion is complete). The oxidizing agent 20 assures a plentiful supply of oxygen and any excess of free oxygen is removed by the reducing agent 44. After combustion has continued for approximately 40 seconds, valve 58 is closed to halt the back-flushing of reservoir 52. One minute later, valve 47 closes.

During the period of time between the closing of valve 58 and the closing of valve 47, the pressure within the reservoir 52 will have dropped to atmospheric. Also during this period, the flashing coil 22 is energized to raise the temperature of the combustion tube walls to approximately 1000° C. for one minute to flash any condensate from the walls of the apparatus into vapor form. Shortly after the valve 47 is closed, valves 26 and 46 are opened, thus injecting pure helium into the inlet end of the combustion tube 14 and forcing the products of combustion into reservoir 52. This flow continues until reservoir 52 is filled with the products of combustion to a pressure of 1500 mm. of mercury. Pressure switch 56 is thereupon activated and closes valve 46. At this point it will be seen that the reservoir 52 contains a sample of gas at preselected pressure, volume, and temperature.

A short time lapse period is now introduced during which the gases within the reservoir are permitted to mix. This period may be for example, one minute and twenty seconds. During this time the recorder 104 may be activated and the output of measuring cells 74, 80, 86 adjusted to zero. After the zeroing procedure and allowing the sample to thoroughly mix within the reservoir 52, valve 62 is closed and valve 68 is opened. Valve 58 then opens and the pressure within reservoir 52 forces the contained gases out through the delay volume 64 and causes a portion of these gases to escape from vent 70. This continues for approximately one minute and twenty seconds, at which time valves 58, 68 both close. In the illustrated embodiment, the velocity of gas flow through delay volume 64 drops to zero before valves 58 and 68 close. However, this is not a necessary condition. Shortly thereafter, valve 62 opens so that pure helium gas begins to flow into the delay volume 64, pushing the remaining sample sequentially through the measuring cells and traps. A certain time lapse is now permitted in order that the various measuring cells may equilibrate.

It will be noted that water is the first product removed by the trap 76. It is necessary to remove water first in order to successfully make the remaining measurements. However, since the water measuring cell requires the longest time to equilibrate, the output reading of this cell is actually recorded last. After passing through the water measuring cell 74, the sample passes through the carbon dioxide cell 80, the carbon dioxide being removed by the trap 82. Since the gases which are being measured are the products of combustion of an organic material, essentially the only component remaining after the removal of water and carbon dioxide is nitrogen. Accordingly, the remaining nitrogen is passed directly through the sample chamber 86a and vented directly to atmosphere. Measurement of nitrogen is made by direct reference against the helium passing through reference chamber 86b.

The readings of the cells are recorded while the gases continue to pass through them. Since the nitrogen reading is the most stable, it is recorded first, producing a peak on the recording chart. The carbon dioxide peak is then recorded and, thereafter, the water peak. Once these measurements have been recorded, the apparatus converts back to the standby position described at the beginning of this section. This causes may remaining matter within the apparatus to be flushed preceding the next analysis.

It will be noted that, in the present invention, the self-integrating features of the Clerc-Simon device are retained, but the disadvantages of a vacuum operation are eliminated. This results from the use of a reservoir which is initially referenced to atmospheric pressure and is then filled with gas at a controlled temperature to a preselected pressure above atmospheric. Upon release of the gas to atmosphere through the measuring cells, the output signals of the measuring cells provide a self-integrated determination of the volume of each component being measured.

Figure 3A:
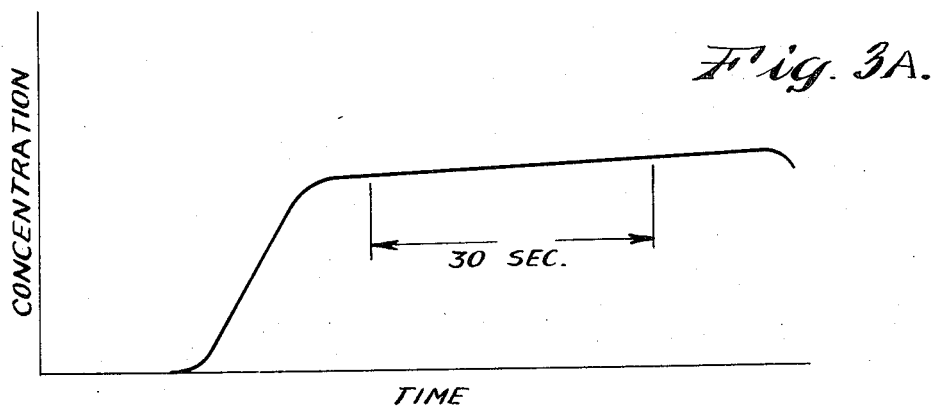
FIGS. 3a and 3b are graphs illustrating certain features of the operation of the invention.
Figure 3B:
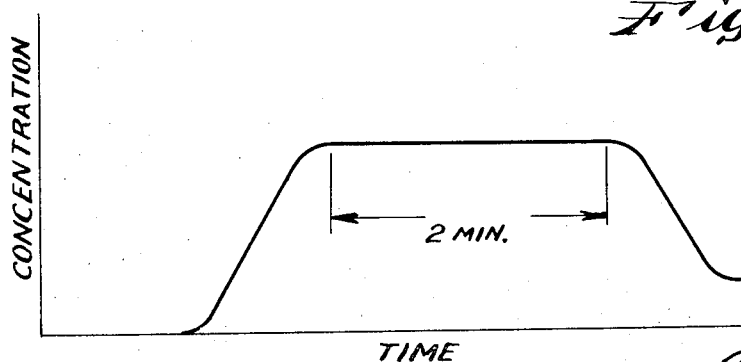

In addition, certain features have been incorporated to overcome the problems created by the shift in equilibrium between the water vapor and the adsorbed water on the walls of the apparatus as the sample gas is expanded from the pressurized reservoir 52 through the measuring cells. This is accomplished by the insertion into the flow path of the delay volume 64. The purpose of this volume is to permit the sampling of a small portion of the gas contained within the reservoir 52, while allowing the measurement to be made over an increased period of time. This will be seen to be analogous to abscissa scale expansion. For example, FIG. 3a is a graph illustrating the variation in water concentration with time, which would normally occur as the gases trapped within reservoir 52 are allowed to expand into the measuring cells. The gradual increase in concentration as the gases in reservoir 52 expand into delay volume 64 is due to an increase in vapor pressure of water as the pressure in the volume is reduced. (That is, the equilibrium of adsorbed water on the walls of the system and water vapor in the gas mixture shifts.) There is indicated on the curve a 30-second period during which the concentration of water is relatively stable. Only this portion of the gas sample is trapped within the delay volume 64. Thereafter, it is read out and, in effect, averaged and equilibrated over a two-minute interval, as illustrated in FIG. 3b. This is accomplished within the water measuring cell 74. Another advantage arises from the additional mixing that occurs as the sample is exhausted from the reservoir 52 into the delay volume 64. Some additional mixing due to diffusion will result because of the rapid passage of the gases through the delay volume 64.

In an actual embodiment of this invention, the heating and valving are controlled automatically by suitable cams. However, it will be understood that these functions could also be controlled by hand or by other mechanical or electrical means.

Although it will be apparent that a number of variations may be made in this invention, in one actual embodiment, reservoir 52 has a volume of 300 cc. and the delay volume 64 has a capacity of 150 cc., the length of the delay volume being 12 feet and its diameter ⅜". This has been found to be useful with a measuring cell flow of 30 cc. per minute and a readout time of two minutes.

It will be obvious to those skilled in the art that the present invention permits observations of a steady state water concentration with minimum change in water condensation. This is achieved by the constant pressure, constant flow sampling system which, in the disclosed embodiment, employs elongated delay volume 64. However, it will also be apparent that similar results could be achieved by piston-controlled changeable volume cylinders if desired. Other modifications will also be apparent to those skilled in the art. Accordingly, the foregoing description is to be construed as illustrative only. This invention is limited only by the scope of the following claims.

What I claim as new and desire to secure by Letters Patent of the United States is:

1. The method of quantitatively analyzing a gaseous mixture for at least one of its components which comprises: trapping a measured volume of said mixture at a known temperature and a preselected pressure; passing at least a portion of said volume to atmosphere at a substantially constant pressure head successively through a sample and a reference chamber; removing said component from said mixture intermediate said sample and reference chambers; and comparing a physical characteristic of the mixture in each of said sample and reference chambers to indicate the amount of said component in said mixture.

2. The method of quantitatively analyzing a gaseous mixture for its components which comprises: trapping a measured volume of said mixture at a known temperature and a preselected superatmospheric pressure; passing at least a portion of said volume into an elongated delay volume to provide a sample volume; ejecting said sample volume from said delay volume at a substantially constant pressure head successively through a first pair of a sample and a reference chamber and a second pair of a sample and a reference chamber; removing a first component from said mixture intermediate the sample and reference chambers of said first pair; removing a second component from said mixture intermediate the sample and reference chambers of said second pair; and comparing a physical characteristic of the mixture in each of the sample and reference chambers of each pair to indicate the amount of each removed component in said mixture.

3. The method of quantitatively analyzing an organic substance for carbon, hydrogen, and nitrogen which comprises: burning a sample of said substance in the presence of oxygen to produce a gaseous mixture of the combustion products of said sample; forcing said gaseous mixture into a reservoir at a preselected superatmospheric pressure; passing at least a portion of said mixture from said reservoir into an elongated delay volume to provide a sample volume having a substantially stable water concentration; ejecting said sample volume from said delay volume at a substantially constant pressure head to atmosphere successively through a water measuring cell, a carbon dioxide measuring cell, and a nitrogen measuring cell, each of said measuring cells including a sample and a reference chamber; removing water from said mixture intermediate the sample and reference chambers of said water measuring cell; removing carbon dioxide from said mixture intermediate the sample and reference chambers of said carbon dioxide measuring cell; and comparing a physical characteristic of the mixture in each of the sample and reference chambers of each measuring cell to indicate the amount of carbon, hydrogen, and nitrogen in said sample.

4. The method of quantitatively analyzing a water-containing gaseous mixture which comprises: trapping a measured volume of said mixture at a known temperature and a preselected atmospheric pressure; exhausting a portion of said volume to atmosphere through an elongated delay volume; trapping a remaining portion of said measured volume within said delay volume at a substantially stable water concentration; forcing said remaining portion at a substantially constant pressure head successively through a first pair of a sample and a reference chamber and a second pair of a sample and a reference chamber; removing the water component from said mixture intermediate said sample and reference chambers of said first pair; removing a different component intermediate the sample and reference chambers of said second pair and comparing the thermal conductivities of the mixture in each of said sample and reference chambers of each pair to indicate the amount of each removed component in said mixture.

5. The method of quantitatively analyzing an organic substance for carbon, hydrogen, and nitrogen which comprises: burning a sample of said substance in the presence of oxygen to produce a gaseous mixture of the combustion products of said sample; forcing said gaseous mixture into a reservior at a preselected superatmospheric pressure; exhausting a portion of said mixture from said reservoir to atmosphere through an elongated delay volume; trapping a remaining portion of said mixture within said delay volume at a substantially stable water concentration; forcing said remaining portion at a substantially constant pressure head successively through a water measuring cell, a carbon dioxide measuring cell, and a nitrogen measuring cell, each of said measuring cells including a sample and a reference chamber; removing water from said mixture intermediate the sample and reference chambers of said water measuring cell; removing carbon dioxide from said mixture intermediate the sample and reference chambers of said carbon dioxide measuring cell; and comparing the thermal conductivities of the mixture in each of the sample and reference chambers of each measuring cell to indicate the amount of carbon, hydrogen, and nitrogen in said sample.

6. Apparatus for quantitatively analyzing a gaseous mixture for its components which comprises: reservoir means for trapping a measured volume of said mixture at a known temperature; first pressurized fluid conduit means connected to force said gaseous mixture into said reservoir means at a preselected superatomspheric pressure; elongated delay volume means having an input and an output end, said input end being connected to receive said mixture from said reservoir means; sample chamber means and reference chamber means in successive fluid flow relationship with the output end of said delay volume means; component detection means within each of said sample and reference chambers; component removing means in fluid flow relationship intermediate said sample and reference chamber; second pressurized fluid conduit means connected to the input end of said delay volume means to force the gaseous mixture contained therein through said sample and reference chambers and said component removing means; and indicator means responsive to said detection means to indicate the quantity of component removed.

7. Apparatus for quantitatively analyzing an organic substance which comprises: an enclosed combustion chamber heatable to a combustion temperature; means for introducing oxygen into said combustion chamber to support the combustion of an organic sample; a temperature-controlled reservoir connected to receive the products of combustion from said combustion chamber; inert gas supply means connected to force said combustion products from said chamber into said reservoir to a preselected superatmospheric pressure; an elongated delay volume having a first end selectively connectable to one of said reservoir and said inert gas supply means and a second end; means for detecting the components of said combustion products connected to the second end of said delay volume; and vent means selectively connectable to the second end of said delay volume.

8. The apparatus of claim 7 wherein each of said vent means and said component detection means exhausts to atmosphere.

9. The apparatus of claim 7 wherein said component detection means comprises a sample and a reference chamber connected in series with component removal means therebetween.

10. The apparatus of claim 7 wherein said component detection means comprises a first sample chamber and a first reference chamber connected in series with the second end of said delay volume and water removal means therebetween; a second sample chamber and a second reference chamber connected in series with the output of said first reference chamber and carbon dioxide removal means therebetween; a third sample chamber connected in series with the output of said second reference chamber; a third reference chamber connected to said inert gas supply means; thermal conductivity detection means in each of said sample and reference chambers to produce a differential signal for each sample and reference chamber pair proportional, respectively, to the water, carbon dioxide, and nitrogen in said products of combustion; and recording means responsive to said differential signals.

References Cited

UNITED STATES PATENTS

| | | | |
|---|---|---|---|
| 3,096,157 | 7/1963 | Brown et al. | 23—232 C |
| 3,241,922 | 3/1966 | Walish | 23—253 PC |
| 3,252,759 | 5/1966 | Simon | 23—230 |

OTHER REFERENCES

Clerc, J. T. et al., Microchemical Journal, vol. 7, pp. 422–436 (1963).

MORRIS O. WOLK, Primary Examiner

E. A. KATZ, Assistant Examiner

U.S. Cl. X.R.

23—230 M, 230 PC, 253 PC, 254 R; 73—23.1; 55—67